April 25, 1933. B. V. HOARD 1,905,226
SERIES CAPACITOR WITH COMBINATION PROTECTIVE EQUIPMENT
Filed June 5, 1931
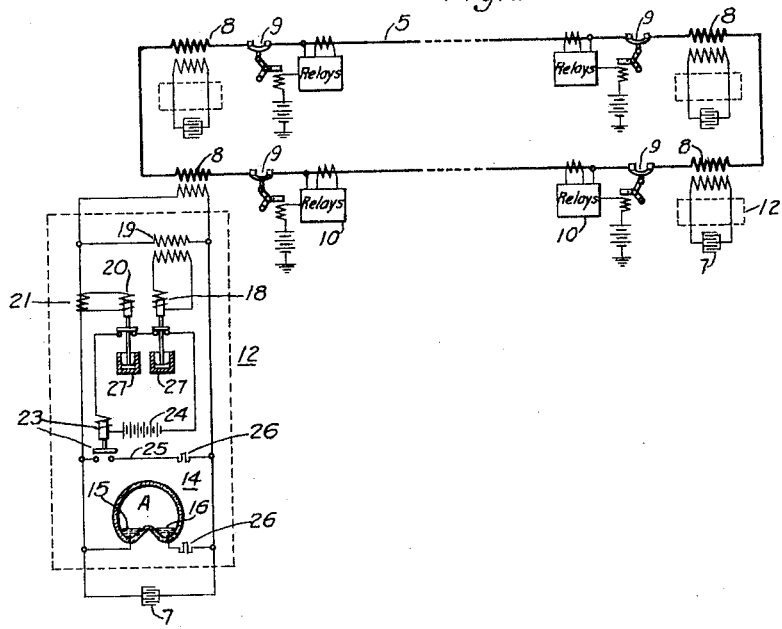
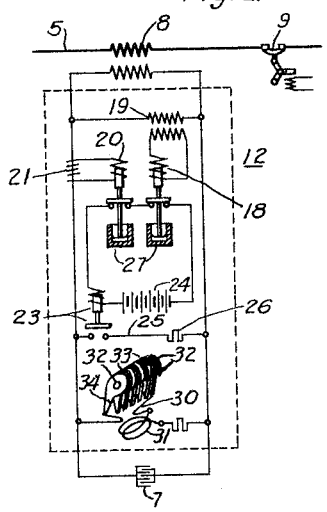
WITNESSES:
INVENTOR
Bert V. Hoard
BY
ATTORNEY Patented Apr. 25, 1933

1,905,226

UNITED STATES PATENT OFFICE

BERT V. HOARD, OF WILKINSBURG, PENNSYLVANIA, ASSIGNOR TO WESTINGHOUSE ELECTRIC & MANUFACTURING COMPANY, A CORPORATION OF PENNSYLVANIA

SERIES CAPACITOR WITH COMBINATION PROTECTIVE EQUIPMENT

Application filed June 5, 1931. Serial No. 542,338.

My invention relates to protective equipment for series capacitors, and systems of utilizing the same.

One of the more specific objects of my invention is to increase the stability of high voltage synchronous-synchronous transmission systems of the type utilizing series capacitors for neutralizing some of the reactance, and particularly such systems as comprise a plurality of line-circuits or line-sections in parallel or in series, as is usually the case. One of the series-capacitor systems heretofore utilized on such transmission lines has involved the use of a spark gap to protect the capacitor, and incidently the transmission system, in the event of a fault on the transmission system, said spark gap being connected in parallel to the capacitor. A breaking down of said spark gap would result in an arc which could not be broken and which could not be permitted to play for very long, because of its destructive character. It was necessary, therefore, in this previous system which I am describing, to develop a circuit breaker of exceedingly high speed of operation, for short circuiting this spark gap and extinguishng the arc before it destroys everything in its vicinity. Consequently, when the fault on the transmission system was cleared, it took some time before this circuit breaker could be opened again, thereby reinserting the series capacitor in the line.

Meanwhile, assuming that the fault on the transmission system occurred in a linesection other than that in which the series capacitor under consideration was connected, the system would have swung through its transient angular displacement of the voltage phase-angles at the two ends of the line, and the line would meanwhile have more series inductance than before the fault occurred, not only on account of the trip-out of the faulty line-section, but also on account of the tripping out of the series capacitor under consideration. This increase in the line-inductance has the effect of decreasing the power capacity or stability limit of the transmission line and this decrease was introduced at the very time when the maximum synchronizing property of the line was needed in order to prevent loss of synchronism or loss of stability. This has been a very serious fault which has undoubtedly militated against the more general use of series capacitors in transmission systems.

According to my invention, I provide means whereby the series capacitor is short circuited instantly, within about 100 microseconds, after the occurrence of critical excess-voltage conditions, said means operating inherently to not only carry the short circuit current during the time necessary to clear the fault, without destructive effects, but also clearing itself immediately after the high voltage condition has ceased, for example, interrupting its arc at the first current-zero thereafter, I illustrate two means for this purpose, either one of which may be used.

A further object of my invention is to provide slower-acting auxiliary protection for the series capacitor, to operate in the event of an overload which persists for a given time, even though said overload is not of sufficient magnitude to cause the instantaneously operative excess-voltage protective means to operate.

With the foregoing and other objects in view, my invention consists in the apparatus, systems, combinations, structures and methods hereinafter described and claimed, and illustrated in the accompanying drawing, wherein Figure 1 is a diagrammatic view of a transmission system embodying my invention, and Fig. 2 is a diagrammatic view of a part of a circuit including a series capacitor, with a modified embodiment of my invention.

Fig. 1 may be regarded as a single-line diagram of a multi-circuit, three-phase, high-voltage, synchronous-synchronous transmission system, comprising synchronous machines at both the sending and receiving ends, as indicated symbolically by the large circles 3 and 4, respectively, and wherein the transmission line is composed of two parallel three-phase circuits 5 and 6, each indicated by a single line, in accordance with a wellknown convention, although it will be understood that each circuit will be composed of three conductors.

By way of illustration, I have indicated a series capacitor 7 connected in series with each of the line-circuits 5 and 6 at each end thereof. Said series capacitor is preferably of the self-clearing fused sectionalized construction described and claimed in an application of Ralph E. Marbury, Serial No. 366,471, filed May 27, 1929, and assigned to the Westinghouse Electric and Manufacturing Company. The effect of an excessive voltage on such a capacitor is merely to increase the rate at which the compositive condenser-sections fail, whereas a failure of the entire capacitor is prevented by the self-clearing nature of the said sections. In general, each capacitor 7 will be composed of a bank of capacitor units of 5 or 10 kilovolt amperes capacity each.

In order to save the expense and risk attendant upon insulatingly supporting such a capacitor bank, with its protective equipment hereinafter described, against the full line voltage, which may be of the order of 100 kilovolts, more or less, it is usually convenient to connect the series capacitor to the line through an insulating transformer 8 as indicated.

Each of the line circuits 5 and 6 is provided, at each of its ends, with a quick-acting sectionalizing circuit breaker 9 which is controlled through quick acting relays which are diagrammatically illustrated at 10, as the particular relaying system is not important to the present invention. These relays and circuit breakers usually clear a faulty line section within 10 or 16 cycles, or within from one-sixth of a second to one-fourth of a second on a 60-cycle system.

It will be understood that the transmission system includes a plurality of line sections, as 5 and 6, connected in parallel, and it frequently includes a number of such sections connected in series. At any rate, when a fault occurs on one of the line sections, excessive fault-currents are fed into the fault from one or more, usually all, of the remaining line sections, so that it is necessary to protect the series capacitors in said remaining line sections against the over voltage which would be created therein by the passage of the excessively large fault-currents therethrough.

To fix our ideas, by a practical illustration, we will suppose a line in which the normal full-load current is 75 amperes, and we will suppose that each capacitor 7 develops 1000 volts reactive compensation at the rated line current of 75 amperes. We will suppose that the maximum short-circuit current of the transmission line is 1000 amperes, which would mean a voltage of some 13 kilovolts across the capacitor, at times of fault, if protective measures were not adopted.

Each of the capacitors 7 is protected, in accordance with my invention, by a protective device which may be conveniently mounted upon a panel, as indicated at 12. As these panels are identical, a showing and description of one will suffice for all.

Each protective equipment consists primarily of a device for instantly short circuiting or by-passing the capacitor when a certain excessive voltage thereacross is developed, for example, when the voltage is increased to 2000 volts in the above-mentioned illustration. Such a device, in Fig. 1, is a tube 14 having two insulated mercury electrodes 15 and 16 which are connected to the two terminals, respectively, of the capacitor 7. This tube 14 is filled with an inactive gas, such as argon, as indicated by the symbol A in the drawing, at such a pressure as to give the tube the required break-down and current-carrying characteristics. Such a tube has the property of carrying large currents, say 1000 amperes, for several seconds, without damage. The current discharge is interrupted at every current-zero and is re-commenced every time the voltage rises again to about 2000 volts, the breakdown occurring within 100 microseconds after this critical break-down voltage has been reached. It will thus be seen that, as soon as the fault on the transmission system is cleared by the tripping of the appropriate sectionalizing breakers 9, the voltage on the capacitors 7 will instantly decrease and the arcs in the tubes 14 will go out at the next current-zero.

In order to protect the capacitor 7 against sustained over-voltages and/or over-currents, such as would occur if the line were over-loaded, beyond its rated capacity of 75 amperes or whatever its capacity is, without producing a capacitor voltage sufficient to break-down the high-speed tube 14, I have provided an under-voltage relay 18, energized from a potential transformer 19 connected across the terminals of the capacitor 7, and an undercurrent relay 20 which is energized from a current transformer 21 in one of the leads of the capacitor 7, so that when either the current or the voltage of the capacitor 7 becomes excessive, an energizing current will be interrupted in the circuit of an energizing coil of a spring-closed contactor or oil circuit-breaker 23 which is normally energized so as to remain in its open position, receiving said energizing-current or power from any suitable current-source such as a battery 24. When the energizing circuit of the contactor 23 is broken, the contactor closes a by-pass circuit 25 across the capacitor 7. This by-pass circuit, as well as the by-pass circuit provided by the tube 14, may be provided with a small resistor 26 for the purpose of limiting the severity of the condenser discharge currents of the capacitor. Such a resistor might have a resistance of the order of one ohm, more or less. In order to prevent the over-voltage or over-current protective equipment from operating too quickly, as in the case of an overload of only momentary duration, or in case of the over-currents which flow at the time when the tube 14 is carrying current, I have provided both the voltage relay 18 and the current relay 20 with dashpots 27, which retard the opening of the relay contacts when the voltage or current respectively increase beyond their critical values. Preferably, however, the dashpots 27 are arranged to permit these relays 18 and 20 to close quickly without opposition whenever normal conditions are restored, so that the capacitor 7 will be put back in circuit again without any delay.

The advantage of my invention, as applied to a high-voltage transmission system, where stability is a problem, is that as soon as the fault is cleared by the tripping of the proper circuit-interrupter 9, the capacitors 7 will be reinserted in the circuits of the line section or sections which remain in service, thereby increasing the power limits, and hence the stability, of the transmission system during that critical period which immediately follows the switching operation, when the transmission system is oscillating, as a result of the displacement of the phase-angles of the voltages at the sending and receiving ends.

Fig. 2 shows a modified form of the instantaneous protective means which is operative in case of a fault. Thus, the tube 14 of Fig. 1 is replaced, in Fig. 2, by a horn gap 30, which breaks down at the critical over-voltage such as 2000 volts, as in the illustrative example. A magnetic blow-out coil 31 is connected in series with the horn gap 30, for the purpose of more quickly blowing the arc upwardly, and suitable means are provided, at the top of the horn gap, for quickly moving and extinguishing the arc. This means preferably takes the form of the arc-extinguishing part of the deion circuit breaker which is described in a patent of Joseph Slepian, No. 1,784,760, granted December 9, 1930, to which reference may be made for a more complete showing and explanation. In general, such a device consists of a number of spaced plates 32 interspersed with a smaller number of spirally wound coils 33, the terminal plates being connected to the two terminals of the horn gap 30. The arc which is formed in the horn gap is blown up into an arc chute 34, in the arc-extinguishing structure, by means of the magnetic blow-out coil 31. The arc then becomes broken up into a large number of serially connected arcs which are rotated at a high rate of speed by means of the magnetic fields of coils 32. Such an arc is extinguished at the first current-zero after it reaches the plates at the upper end of the arc chute 34. Such an arc may take a half-cycle, more or less, to pass through the arc chute 34, depending upon the strength of the magnetic field produced by the blow-out coil 31. If the arc is extinguished, as will usually be the case, before the fault is cleared from the line-circuit, the horn gap 30 will break down the next time the voltage rises to its critical break-down value in the next half cycle, similar to the operation already described for the tube 14. The remainder of the equipment in Fig. 2 is the same as in Fig. 1 and needs no further description.

Among the uses or applications of my invention that are intended to be embraced in Fig. 2, one of the most important may be the protection of series capacitors which are connected in series with alternating-current dynamo-electric machines to neutralize some or all of the internal reactances thereof, such, for example, as the synchronous condenser and series capacitor which constitutes the subject-matter of an application of C. F. Wagner, Serial No. 559,472, filed August 26, 1931, assigned to the Westinghouse Electric & Manufacturing Company.

While I have illustrated my invention in two preferred forms of embodiment, it will be obvious that modifications and changes may be made within the spirit of my invention. I desire, therefore, that the appended claims be accorded the broadest interpretation consistent with their language and the prior art.

I claim as my invention:

1. A synchronous-synchronous transmission system comprising a plurality of line sections, with high-speed fault-clearing relaying and circuit-interrupter means in each line-section, characterized by a series capacitor connected in series relation to a line-section, excess-voltage flash-over means in parallel relation to the series capacitor in said line-section, said flash-over means being of a type which is capable of carrying the current which would otherwise have passed through the capacitor, in the event of a fault on the transmission system, for a time longer than that necessary for the high-speed fault clearing relaying and circuit-interrupter means to clear the fault and being self-extinguishing when the voltage across itself returns to normal, whereby the series capacitor is automatically re-inserted in its line-section immediately after the clearance of a fault in another line-section.

2. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means being of a type which is capable of carrying the current which would otherwise have passed through the capacitor, in the event of a fault in the alternating-current circuit, for a time longer than that necessary for the fault-clearing means to clear the fault and being self-extinguishing when the voltage across itself returns to normal.

3. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a gas-filled tube having two mercury electrodes.

4. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a stationary-electrode spark-gap device for initiating an arc, and arc-extinguishing means for keeping the arc moving so that it will not seriously burn the arc-electrodes during the time required for said fault-clearing means to clear the fault.

5. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a stationary-electrode spark-gap device for initiating an arc, and arc-blowing and suppressing means for extinguishing the arc initiated in said spark-gap device.

6. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit.

7. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and means operating more slowly than said break-down gap device for providing a by-pass circuit around said series capacitor in response to sustained over-voltages across said capacitor, said last-mentioned-over-voltages being lower than the break-down voltage of said gap device, and for quickly opening said by-pass circuit when said over-voltage condition is ended.

8. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and means operating more slowly than said break-down gap device for providing a by-pass circuit around said series capacitor in response to sustained over-currents in said alternating-current circuit, and for quickly opening said by-pass circuit when said over-current condition is ended.

9. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and means operating more slowly than said break-down gap device for providing a by-pass circuit around said series capacitor in response to sustained over-currents in the alternating-current circuit and/or over voltages across said capacitor, said sustained over-voltages being lower than the break-down voltage of said gap device, and for quickly opening said by-pass circuit when said over-current and/or over-voltage condition is ended.

10. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and slower-acting means, operative only after said fault-clearing means has had a chance to operate, for providing a by-pass circuit around said series capacitor in response to sustained over-voltages across said capacitor, said sustained over-voltages being lower than the break-down voltage of said gap device, and for quickly opening said by-pass circuit when said over-voltage condition is ended.

11. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and slower-acting means, operative only after said fault-clearing means has had a chance to operate, for providing a by-pass circuit around said series capacitor in response to sustained over-currents in the alternating-current circuit, and for quickly opening said by-pass circuit when said over-current condition is ended.

12. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes its arc and becomes insulating again promptly after the voltage across itself drops to a predetermined value which is higher than that corresponding to normal load conditions in the alternating-current circuit, and slower-acting means, operative only after said fault-clearing means has had a chance to operate, for providing a by-pass circuit around said series capacitor in response to sustained over-currents in the alternating-current circuit and/or over-voltages across said capacitor, said sustained over-voltages being lower than the break-down voltage of said gap device, and for quickly opening said by-pass circuit when said over-current and/or over-voltage condition is ended.

13. A synchronous-synchronous transmission system comprising a plurality of line sections, with high-speed fault-clearing relaying and circuit-interrupter means in each line-section, characterized by a series capacitor connected in series relation to a line-section, excess-voltage flash-over means in parallel relation to the series capacitor in said line-section, said flash-over means being of a type which is capable of carrying the current which would otherwise have passed through the capacitor, in the event of a fault on the transmission system, for a time longer than that necessary for the high-speed fault-clearing relaying and circuit-interrupter means to clear the fault and being self-extinguishing at the close of each half-cycle and being non-restriking when the voltage across itself in any half-cycle returns to normal, whereby the series capacitor is automatically reinserted in its line-section immediately after the clearance of a fault in another line-section.

14. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means being of a type which is capable of carrying the current which would otherwise have passed through the capacitor, in the event of a fault in the alternating-current circuit, for a time longer than that necessary for the fault-clearing means to clear the fault and being self-extinguishing at the close of each half-cycle and being non-restriking unless and until the voltage across itself in the succeeding half-cycle reaches a predetermined value in excess of normal.

15. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes itself and becomes insulating again at the close of each half-cycle and which automatically restrikes and becomes conducting again in the succeeding half-cycle only if and when the voltage across itself in said succeeding half-cycle attains a value indicative of a continuance of an abnormal condition in the alternating-current circuit.

16. An alternating-current circuit subject to faults and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes itself and becomes insulating again at the close of each half-cycle and which automatically restrikes and becomes conducting again in the succeeding half-cycle only if and when the voltage across itself in said succeeding half-cycle attains a value indicative of a continuance of an abnormal condition in the alternating-current circuit, and means operating more slowly than said break-down gap device for providing a by-pass circuit around said series capacitor in response to sustained over-voltages across said capacitor, said last-mentioned over-voltages being lower than the break-down voltage of said gap device, and for quickly opening said by-pass circuit when said over-voltage condition is ended.

17. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes itself and becomes insulating again at the close of each half-cycle and which automatically restrikes and becomes conducting again in the succeeding half-cycle only if and when the voltage across itself in said succeeding half-cycle attains a value indicative of a continuance of an abnormal condition in the alternating-current circuit, and means operating more slowly than said fault-clearing means for providing a by-pass circuit around said series capacitor in response to sustained over-currents in said alternating-current circuit, and for quickly opening said by-pass circuit when said over-current condition is ended.

18. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating break-down gap device which becomes conducting when a predetermined excess-voltage across itself is reached and which inherently extinguishes itself and becomes insulating again at the close of each half-cycle and which automatically restrikes and becomes conducting again in the succeeding half-cycle only if and when the voltage across itself in said succeeding half-cycle attains a value indicative of a continuance of an abnormal condition in the alternating-current circuit and slower-acting means, operative only after said fault-clearing means has had a chance to operate, for providing a by-pass circuit around said series capacitor in response to sustained over-voltages across said capacitor, said sustained over-voltages being lower than the break-down voltage of said gap device, and for quickly opening said by-pass circuit when said over-voltage condition is ended.

19. An alternating-current circuit subject to abnormally excessive current-conditions and including a series capacitor connected in series relation thereto, fault-clearing means associated with said circuit, and protective means for the series capacitor, said protective means comprising excess-voltage flash-over means in parallel relation to the series capacitor, said flash-over means comprising a substantially instantaneously operating breakdown gap device which becomes conducting when a predetermined excess-voltage across itself is reached and which inherently extinguishes itself and becomes insulating again at the close of each half-cycle and which automatically restrikes and becomes conducting again in the succeeding half-cycle only if and when the voltage across itself in said succeeding half-cycle attains a value indicative of a continuance of an abnormal condition in the alternating-current circuit, and slower-acting means, operative only after said fault-clearing means has had a chance to operate, for providing a by-pass circuit around said series capacitor in response to sustained over-currents in the alternating-current circuit, and for quickly opening said by-pass circuit when said over-current condition is ended.

In testimony whereof, I have hereunto subscribed my name this 29th day of May 1931.

BERT V. HOARD.